Sept. 29, 1953 K. A. MATTHEWS ET AL 2,653,374

ELECTRIC SEMICONDUCTOR

Filed March 18, 1950

Inventors
KENNETH A. MATTHEWS
CHARLES DEB. WHITE

By Percy P. Lantzy
Attorney

Patented Sept. 29, 1953 2,653,374

UNITED STATES PATENT OFFICE 2,653,374

ELECTRIC SEMICONDUCTOR

Kenneth Albert Matthews and Charles De Boismaison White, London, England, assignors to International Standard Electric Corporation, New York, N. Y.

Application March 18, 1950, Serial No. 150,412
In Great Britain April 1, 1949

5 Claims. (Cl. 29—25.3)

The present invention relates to electric amplifying devices employing semi-conductors which have been called for convenience "crystal triodes."

For the purpose of this specification, a crystal triode means a body of semi-conducting material (such as a crystal of germanium) having in rectifying contact with its surface at least two electrodes placed close together, but not in actual contact. One of these electrodes is called "emitter electrode" and the other is called the "collector electrode." In contact with the semi-conducting body is also a third electrode called the "base electrode" which may take the form of a metal cup or holder on which the semi-conductor is mounted, although the use of the term "base electrode" should not be taken as restricting the invention to such amplifying devices in which the third electrode is of extended area.

The emitter and collector electrodes of a crystal triode may consist of fine wires or "catswhiskers." The emitter electrode may be used as an input electrode of the crystal triode, and the collector electrode may be used as an output electrode.

By means of a suitable associated circuit a power gain may usually be obtained with a crystal triode, but it cannot always be made to give a current gain, which is very desirable for many applications.

The principal object of the present invention, therefore, is to provide an improved crystal triode which is capable of giving a large current gain. This object is achieved by means of a particular electro-forming process. Thus the invention provides an electro-forming process for a crystal triode which comprises passing a relatively small direct current between the emitter and collector electrodes of the triode, the base electrode being left unconnected, and then momentarily increasing the said direct current to a relatively large value, in such manner that after electro-forming, the current-voltage characteristic curve of the emitter-collector path, when measured with the emitter electrode polarised in such direction that it makes low resistance rectifier contact with the semi-conducting material, has no portion with a negative slope in the region.

The invention also provides a circuit for electro-forming a crystal triode comprising a generator of regularly repeated unidirectional voltage waves, means for connecting the path between the emitter and collector electrodes of the crystal triode in series with a current limiting resistance to the generator, means for tracing the current-voltage characteristic curve of the said path, and means for momentarily reducing the value of the said resistance.

In the study of semi-conducting materials for use as rectifiers, it has been the practice in some circles to divide the materials into two classes, namely N-type materials and P-type materials. In the N-type, the conduction of the current in the material is principally due to the migration of a few free electrons, while in the P-type, it is said to be due to the migration of what are called "positive holes," that is, deficiencies of electrons in a few atoms of the material.

Up to the present, crystal triodes have been generally constructed with N-type material, and germanium has been commonly used as the semi-conductor. In order to operate as an amplifier, it is necessary to treat the surface by known methods, to produce good rectifying properties. The two catswhisker electrodes are arranged in contact with the treated surface. Then the emitter or input electrode has to be polarised positively to the collector or output electrode. It is however, also possible to produce a crystal triode from P-type material, in which case the emitter electrode must be polarised negatively to the collector electrode.

The invention will be described in relation to a crystal triode comprising an N-type semi-conducting substance in contact with which are the two catswhisker electrodes of small contact area placed very close together. It has been found to be important that at least the electrode which will be the collector electrode should be softer than the surface of the semi-conductor.

It has also been found to be important, at least when a crystal of N-type germanium is used as the semi-conducting substance, that the material of the collector electrode should contain as an additive a small quantity of phosphorus or arsenic or other donor type of impurity. For example, it has been found that Phosphor bronze is a suitable material for the collector electrode, and may be used also quite satisfactorily for the emitter electrode.

Preferably, the germanium crystal should have a hard surface, and both the catswhiskers electrodes should be suitably pointed. The pointed ends should be placed about two or three thousandths of an inch apart. It has been found that a chisel point obtained by cutting the wire in a plane making a small angle with the axis of the wire is satisfactory, though a sharp conical point produced electrolytically can be used.

In making one form of a crystal triode, the germanium is melted and cast into suitable ingots, and a disc of suitable size is cut from an ingot. Any usual surface treatment such as is customary to apply to germanium used in a diode rectifier, is given to the surface to which the point contacts are to be made.

After the germanium surface has been treated and provided with a pair of catswhiskers of which at least the collector electrode is Phosphor bronze, the following electroforming process is applied. This process will be described with reference to the drawing accompanying the provisional specification in which.

Figure 1:
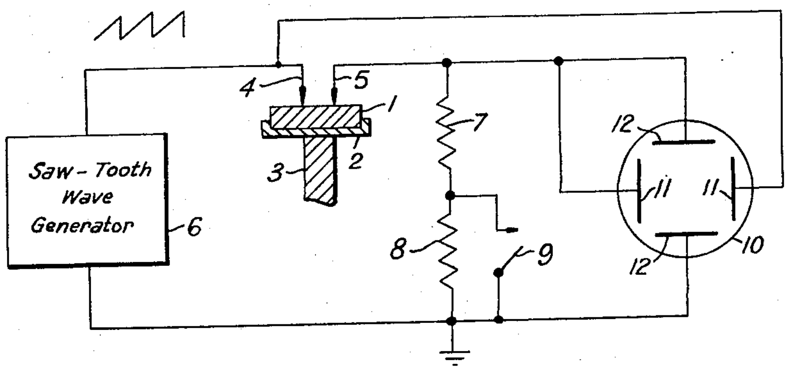
Fig. 1 shows the electro-forming and testing circuit.

In the forming circuit, Fig. 1, a crystal triode is shown in section and consists of a disc or plate 1 of germanium secured to a metal base 2 having a base terminal lug 3. The emitter electrode is shown at 4 and the collector electrode at 5.

A generator 6 of saw tooth waves, having a low impedance output circuit capable of supplying currents up to about 100 milliamperes, has one terminal connected to ground and the other connected to the emitter electrode 4. The circuit is completed by two resistances 7 and 8 connecting the collector electrode 5 to ground, and a switch 9 is provided by means of which the resistance 8 can be short-circuited.

The testing device comprises a cathode ray tube 10 of conventional type, only the deflecting plates of which are shown. The horizontally deflecting plates 11 are connected respectively to the electrodes 4 and 5, and the vertically deflecting plates 12 are connected across the resistances 7 and 8. It will thus be clear that the horizontal deflection of the cathode ray will be proportional to the voltage applied between the emitter and collector electrodes 4 and 5, and the vertical deflection will be proportional to the current which passes between the two electrodes.

It should be carefully noted that for properly forming the crystal triode formed from N-type material, the generator 6 should provide a positive output voltage, so that the emitter electrode is always positive to the collector electrode. The saw tooth waves should preferably be such that the output voltage varies steadily from zero to a positive value which may be between 40 and 100 volts, and then flies back rapidly to zero. It is also very important that the base electrode should be left unconnected.

Figure 2:
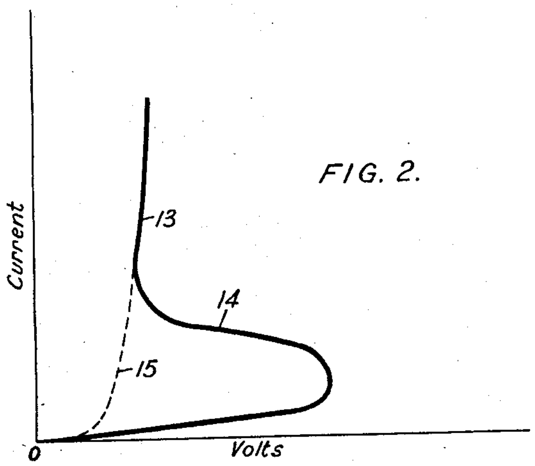
Fig. 2 shows the characteristic obtained on the cathode ray tube used in the testing circuit.

The resistances 7 and 8 should be chosen so that normally a small current flows in the forming circuit. It is then found that generally the curve traced on the oscillograph screen is at first as shown in Fig. 2 by the full line curve 13, 14. This curve shows the current in the circuit as ordinates plotted against the voltage of the generator as abscissae, for the forward or scanning strokes of the saw tooth waves. A different return curve is traced during the fly-back strokes, but this is of no interest and is not visible owing to the rapidity of return of the spot to zero. It will be seen that the curve 13, 14 has a loop with a portion 14 having a negative slope, indicating a negative resistance condition between the electrodes 4 and 5.

In order to form the crystal triode, the switch 9 is momentarily closed, thus short-circuiting the resistance 8 and greatly increasing the current in the circuit. At the same time, the curve traced on the tube 10 will momentarily collapse downwards due to the reduction of the vertical scale by the short-circuiting of the resistance. When the switch is re-opened, it will usually be found that the loop of the curve 13 will have become reduced, and in some cases will have completely disappeared, the curve on the screen then being as shown partly by the full line 13, and partly by the dotted line 15. If the loop does not disappear completely the first time, by repeating the process two or three times, the loop can be entirely removed, so that the characteristic curve follows the smooth dotted portion 15. This is the condition under which it will be found that the crystal triode produces the maximum current gain.

It should be particularly noted that the forming process is carried out between the two catswhisker electrodes and not between either and the base 3, which is left unconnected in the forming circuit. Further, the emitter electrode should be positive to the collector electrode during the forming.

It should be added that the use of saw-tooth waves is not essential for forming the crystal triode according to this invention; for example, positive rectangular pulses could be used, or the positive loops of sine waves. However, the use of saw-tooth waves is very convenient when it is desired to carry out the forming and testing process, in the same circuit.

It is further to be noted that a low reverse resistance measured between the collector electrode 5 and the base 3 (treated as a simple rectifier) is detrimental to good current and power gain characteristics and should therefore be avoided. This is one of the reasons for forming between the emitter and collector electrode, because it is found that if the electro-forming is carried out between the collector electrode 5 and the base 3, a low reverse resistance generally results when using a soft metal for the collector electrode.

It should be pointed out that if the process of forming should be overdone, the loop with the negative slope may re-appear. It is found that by repeating the process the loop can be made to collapse again so that the smooth curve 15 can always be produced.

A further point to note is that it may occasionally be found that the forming process fails to reduce the loop. The reason for this is not clearly understood, but it will generally be found that the desired results can be obtained by shifting the catswhiskers to another part of the crystal. Very rarely no part of the crystal surface can be found which is satisfactory, and in this case the surface should be ground off and retreated, and the electro-forming repeated when the desired results will generally follow.

It should be understood that the crystal triode may take other forms than that shown in Fig. 1. For example, it may consist of a disc with a very thin central portion, the emitter and collector electrodes making contact with opposite side of the thin portion.

It has been assumed so far that the crystal triode employs an N-type semi-conductor. However, if the semi-conductor should be of the P-type, the arrangements described with reference to Fig. 1 will be the same, except that the collector electrode should contain an additive of the acceptor type, and that the generator 6 should be arranged to supply a negative voltage to the emitter electrode 4 instead of a positive voltage.

In other words, whichever type of semi-conducting material is used, the potentials of the emitter and collector electrodes should be such that the emitter electrode 4 is biased in the conducting direction when considered as forming a rectifier with the semi-conductor.

To sum it up, it may be said that the essential requirements for producing a crystal triode with a high current gain are:

1. The collector electrode should contain an additive which acts as a donor or acceptor impurity for the semi-conductor when the letter is of the N- or the P-type, respectively. It is also advantageous for the material of the collector electrode to be softer than the surface of the semi-conductor.

2. The semi-conductor surface must be suitably treated to give it good rectification properties.

3. An electro-forming process between the emitter and collector electrodes must be carried out whereby the loop of the characteristic curve having the negative slope is removed, the emitter being always positive or always negative to the collector during the forming process, according as the semi-conductor is of the N or the P-type, respectively.

While the principles of the invention have been described above in connection with specific embodiments, and particular modifications thereof, it is to be clearly understood that this description is made only bay way of example and not as a limitation on the scope of the invention.

What is claimed is:

1. An electro-forming process for a crystal triode which comprises passing a relatively small direct current between the emitter and collector electrodes of the triode, the base electrode being left unconnected, and then momentarily increasing the said direct current to a relatively large value, in such manner that after electro-forming, the current-voltage characteristic curve of the emitter-collector path, when measured with the emitter electrode polarised in such direction that it makes low resistance rectifier contact with the semi-conducting material, has no portion with a negative slope.

2. An electro-forming process for a crystal triode employing an N-type semi-conductor, the collector electrode of which includes as an additive a donor type of impurity, which comprises polarising the emitter electrode positively with respect to the collector electrode, using a small polarising current, the base electrode being left unconnected, and then momentarily increasing the said polarising current in such manner that after electro-forming, the current-voltage characteristic curve of the emitter-collector path has no portion with a negative slope, in the region wherein the emitter electrode is positive to the collector electrode.

3. An electro-forming process for a crystal triode employing a P-type semi-conductor, the collector electrode of which includes as an additive an acceptor type of impurity, which comprises polarising the emitter electrode negatively with respect to the collector electrode using a small polarising current, the base electrode being left unconnected, and then momentarily increasing the said polarising current in such manner that after electro-forming the current-voltage characteristic curve of the emitter-collector path has no portion with a negative slope, in the region wherein the emitter electrode is negative to the collector electrode.

4. A method of producing a crystal triode employing N-type germanium crystal as the semiconducting material, and a Phosphor-bronze collector electrode, comprising treating the crystal to produce good rectification properties, and applying an electro-forming process according to claim 1 in such manner that the emitter electrode is always positive to the collector electrode.

5. A circuit for electro-forming a crystal triode, comprising a generator of regularly repeated unidirectional voltage waves, a resistor means for connecting the path between the emitter and collector electrodes of the crystal triode in series with said current limiting resistor to the generator, means for tracing the current-voltage characteristic curve of the said path, and means for momentarily reducing the value of the said resistor.

KENNETH ALBERT MATTHEWS.
CHARLES DE BOISMAISON WHITE.

References Cited in the file of this patent

UNITED STATES PATENTS

| Number | Name | Date |
|---|---|---|
| 2,446,467 | Fry | Aug. 3, 1948 |
| 2,577,803 | Pfann | Dec. 11, 1951 |